(12) United States Patent
Patwardhan et al.

(10) Patent No.: US 7,062,406 B2
(45) Date of Patent: Jun. 13, 2006

(54) METHOD AND SYSTEM FOR WATER QUALITY TRADING

(75) Inventors: Avinash S. Patwardhan, Wellington, FL (US); Aditya Tyagi, Round Rock, TX (US)

(73) Assignee: CH2M Hill, Inc., Englewood, CO (US)

( * ) Notice: Subject to any disclaimer, the term of this patent is extended or adjusted under 35 U.S.C. 154(b) by 170 days.

(21) Appl. No.: 10/714,590

(22) Filed: Nov. 13, 2003

(65) Prior Publication Data

US 2005/0103720 A1    May 19, 2005

(51) Int. Cl.
G06F 101/14    (2006.01)
G06F 15/00     (2006.01)
G06F 17/18     (2006.01)

(52) U.S. Cl. ...................... 702/179; 210/739
(58) Field of Classification Search ............ None
See application file for complete search history.

(56) References Cited

U.S. PATENT DOCUMENTS 6,845,336 B1 * 1/2005 Kodukula et al. .......... 702/118
2002/0055902 A1 * 5/2002 Faeth ........................ 705/37
2002/0173980 A1   11/2002 Daggett et al.
2002/0188459 A1   12/2002 Erickson
2003/0047508 A1 * 3/2003 Boles et al. ............... 210/606
2003/0055665 A1   3/2003 Fleming
2003/0085179 A1   5/2003 Kim et al.
2003/0222005 A1 * 12/2003 Polizzotto et al. .......... 210/143
2003/0230523 A1 * 12/2003 Polizzotto et al. .......... 210/143

* cited by examiner

Primary Examiner—Bryan Bui
Assistant Examiner—Aditya S. Bhat
(74) Attorney, Agent, or Firm—Perkins Coie LLP

(57) ABSTRACT

A method and system for calculating trading ratios between a buyer and a seller of water quality pollutant load credits. The water quality trading system ("WQTS") inputs a definition of watershed and land uses of the watershed. The WQTS then calculates the load credits (e.g., the difference between total maximum daily load of the pollutant and the actual load needed) of applying various controls (e.g., best management practices and treatments) to the point sources and non-point sources of the watershed. The load credits take into consideration the uncertainty of the calculated loads.

29 Claims, 13 Drawing Sheets

Existing and Future TP loading at 030701030301_030701030305

| SubWaterShed | Non-Point Sources | | | | Point Sources | | Total TP Load | | |
|---|---|---|---|---|---|---|---|---|---|
| | Current | Future | Future P50 | Future P95 | Current | Future | Current | Future P50 | Future P95 |
| 030701030101 | 11,512 | 12,260 | 13,029 | 14,510 | 630 | 501 | 12,142 | 13,530 | 15,011 |
| 030701030102 | 15,362 | 16,438 | 17,734 | 20,228 | 1,858 | 1,805 | 17,221 | 19,539 | 22,034 |
| 030701030103 | 15,281 | 16,248 | 17,935 | 21,182 | 28,029 | 0 | 43,310 | 17,935 | 21,182 |
| 030701030104 | 16,819 | 17,508 | 19,561 | 23,514 | 0 | 0 | 16,819 | 19,561 | 23,514 |
| 030701030105 | 13,937 | 15,347 | 16,827 | 19,678 | 5,841 | 0 | 19,778 | 16,827 | 19,678 |
| 030701030106 | 8,651 | 8,482 | 9,411 | 11,200 | 0 | 0 | 8,651 | 9,411 | 11,200 |
| 030701030107A | 590 | 513 | 586 | 726 | 0 | 0 | 590 | 586 | 726 |
| 030701030108B | 11,677 | 10,583 | 11,728 | 13,934 | 0 | 0 | 11,677 | 11,728 | 13,934 |
| 030701030301 | 6,059 | 5,633 | 6,149 | 7,142 | 0 | 0 | 6,059 | 6,149 | 7,142 |
| Confluence Point Total | 99,888 | 103,012 | 112,960 | 132,114 | 36,358 | 2,306 | 136,246 | 115,267 | 134,420 |

Discharge Requirement: Exceeds? No No No

Fig. 2

Local Credits at 030701030305_Outside

SubWatershed: 030701030101
Existing Load: 12,064
Future Load: 11,214
Future Load
with No Control: 11,718
Local Credit: 503

Non-Point Source

| Land Use | % | BMP | Install Year | Life | Efficiency | Load Reduced | Cost/Pound | Total Cost |
|---|---|---|---|---|---|---|---|---|
| Commercial | 0 | | | | | | | |
| Forest/OpenSpace | 0 | | | | | | | |
| High Density Residential | 0 | | | | | | | |
| Industrial / Institutional | 100 | Grassed Ditch (<5%slope,dam) | 2005 | 50 | 0.34 | 503 | $1,791 | $901,350 |
| Low Density Residential | 0 | | | | | | | |
| Medium Density Residential | 0 | | | | | | | |
| Transportation and Utilities | 0 | | | | | | | |
| Water / Wetlands | 0 | | | | | | | |

Point Source

| PoinSourceID | PS Name | Treatment Type | Effluent Conc. | Install Year | Total Cost |
|---|---|---|---|---|---|
| GA_McDaniel | McDaniel CSO | | | | $0 |

Fig. 4

SubWatershed: 030701030101
NPS Cost: $901,350    PS Cost: $0    Total: $901,350

| Year | Existing Load | Future Load No Controls | Future Load w/Controls | Local Credit | Watershed Credit | UR |
|---|---|---|---|---|---|---|
| 2003 | 12,064 | 14,269 | 14,269 | 0 | 0 | 0.98206 |
| 2004 | 12,064 | 14,269 | 14,269 | 0 | 0 | 0.98206 |
| 2005 | 12,064 | 14,269 | 13,779 | 453 | 490 | 0.98197 |
| 2006 | 12,064 | 14,269 | 13,752 | 478 | 517 | 0.98196 |
| 2007 | 12,064 | 14,269 | 13,725 | 503 | 544 | 0.98195 |
| 2008 | 12,064 | 14,269 | 13,725 | 503 | 544 | 0.98195 |
| 2009 | 12,064 | 14,269 | 13,725 | 503 | 544 | 0.98195 |
| 2010 | 12,064 | 14,269 | 13,725 | 503 | 544 | 0.98195 |
| 2011 | 12,064 | 14,269 | 13,737 | 492 | 532 | 0.98196 |
| 2012 | 12,064 | 14,269 | 13,749 | 481 | 520 | 0.98196 |
| 2013 | 12,064 | 14,269 | 13,761 | 470 | 508 | 0.98197 |
| 2014 | 12,064 | 14,269 | 13,773 | 458 | 496 | 0.98197 |
| 2015 | 12,064 | 14,269 | 13,785 | 447 | 484 | 0.98198 |
| 2016 | 12,064 | 14,269 | 13,797 | 436 | 472 | 0.98198 |
| 2017 | 12,064 | 14,269 | 13,810 | 425 | 460 | 0.98198 |
| 2018 | 12,064 | 14,269 | 13,822 | 414 | 448 | 0.98199 |
| 2019 | 12,064 | 14,269 | 13,834 | 403 | 436 | 0.98199 |
| 2020 | 12,064 | 14,269 | 13,846 | 391 | 423 | 0.98200 |
| 2021 | 12,064 | 14,269 | 13,858 | 380 | 411 | 0.98200 |
| 2022 | 12,064 | 14,269 | 13,870 | 369 | 399 | 0.98200 |

*Fig. 5B*

METHOD AND SYSTEM FOR WATER QUALITY TRADING

TECHNICAL FIELD

The described technology relates generally to analysis of pollutant loading in a watershed and particularly accounting for the uncertainty in both the pollutant loading and pollutant removal efficiency of best management practices implemented as controls and in determining trading ratios.

BACKGROUND

Many watersheds throughout the country are approaching or already exceeding their allowable pollutant loading capacities referred to as total maximum daily loads ("TMDLs"). As a result, it is becoming increasingly important for watershed management to provide an economical way for ensuring that the TMDLs are not exceeded. Watershed management is important for watersheds not only because TMDLs for many watersheds are currently defined, but also because many existing TMDLs are expected to be revised and TMDLs for many other watersheds are expected to be promulgated in the near future. The changes to the TMDLs will likely have a significant impact on the treatment costs for both point and non-point sources of pollutants. The United States Environmental Protection Agency published a Water Quality Trading Policy on Jan. 13, 2003, which is hereby incorporated by reference, stating that a market-based approach to water quality trading can provide flexibility and achieve water quality and environmental benefits greater than would otherwise be achieved under more traditional regulatory approaches. A market-based, water quality trading approach can be used by utilities, industries, county governments, and so on to achieve economically sound development and meet the EPA's water quality goals.

Any such water quality trading should factor in the high degree of uncertainty that results from various watershed processes such as rainfall runoff, soil erosion, sediment delivery, pollutant generation, and so on. It is desirable to have a tool to assist in analyzing water quality trading potentials that factor in this uncertainty.

BRIEF DESCRIPTION OF THE DRAWINGS

FIG. 2 illustrates a sample report listing the current and future pollutant loads for a selected confluence point in one embodiment.

FIG. 4 illustrates a report listing the local credits for a subwatershed in one embodiment.

FIG. 5B illustrates a report of the earned credits for a subwatershed contributing to a confluence point in one embodiment.

DETAILED DESCRIPTION

Figure 1:
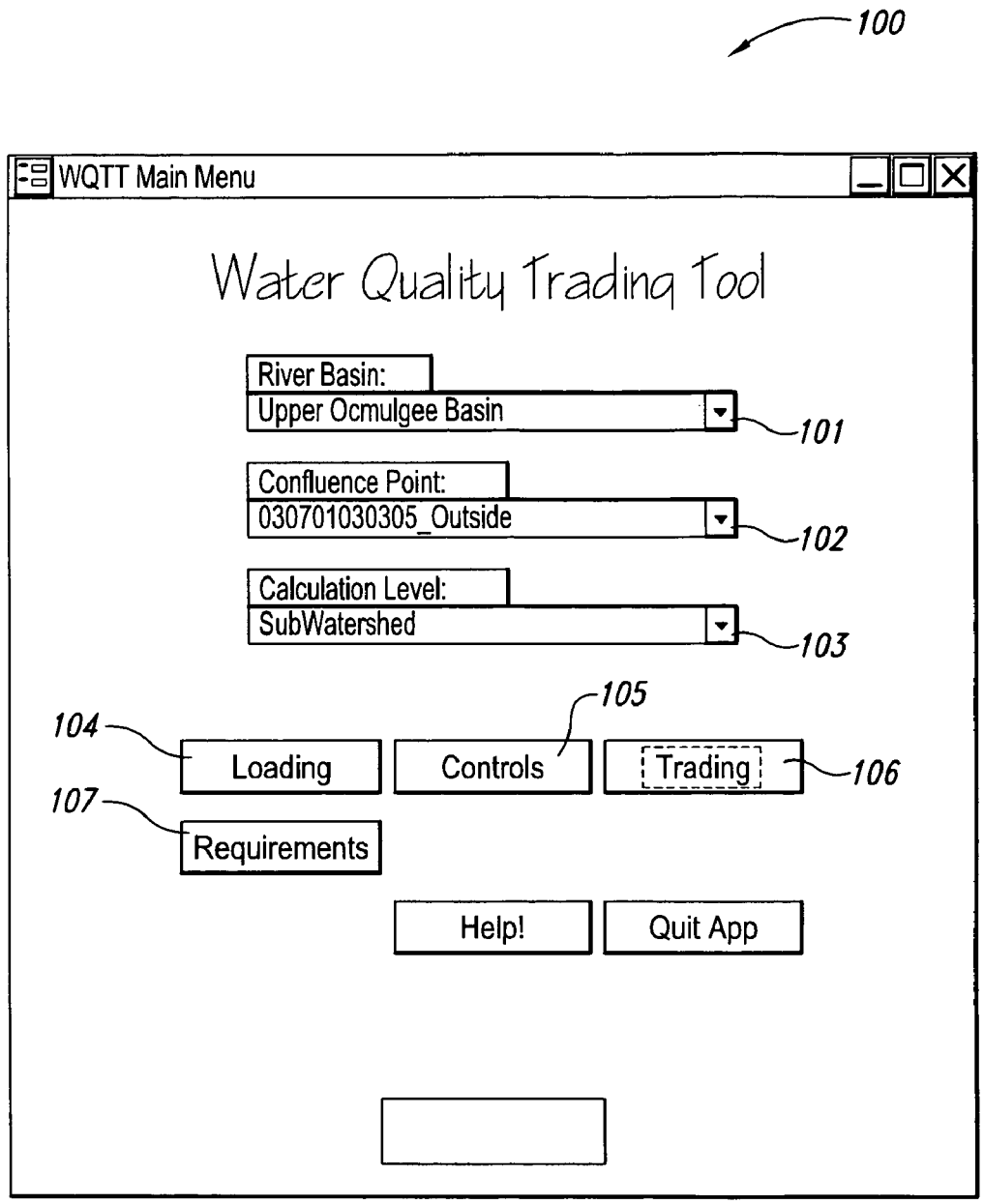
FIG. 1 illustrates an initial display page of the WQTS in one embodiment.

A method and system for calculating trading ratios between a buyer and a seller of water quality pollutant load credits is provided. In one embodiment, the water quality trading system ("WQTS") inputs a definition of watershed and land uses of the watershed. The WQTS then calculates the load credits (e.g., the difference between the total maximum daily load ("TMDL") of the pollutant and the actual load) of applying various controls (e.g., best management practices ("BMPs") and treatments) to the point sources and non-point sources of the watershed. The load credits take into consideration the uncertainty of the calculated loads. The uncertainty can result from uncertainty in the export coefficient of a land use, in the removal efficiency of a BMP, and so on. The WQTS calculates an uncertainty ratio that will reduce the number of transferable credits generated by calculated non-point source reduction to account for variability in the effectiveness of the controlling practice (e.g., BMPs) implemented. For example, a seller may have a daily load credit of 500 lbs/day and the uncertainty is 0.7, then the available credits for sale are 500×0.7=350 lbs/day. To account for the difference between the uncertainty ratios of the available credits of a seller and the needed credits of a buyer, the WQTS calculates a trading ratio to indicate the equivalency between the available and needed credits. In one embodiment, the trading ratio is the exchange ratio of the seller divided by the exchange ratio of the buyer. When the exchange ratio of both the buyer and the seller are the same (e.g., both 0.7), then the trading ratio is 1, which means the available credits can be traded on a one-for-one basis with the needed credits. This happens mostly when the sellers and buyers are located in the same vicinity. When the trading ratio is greater than one, then an available credit is worth more than a needed credit. For example, if the trading ratio is 2, then the buyer would need to purchase 2 available credits from the seller for every needed credit. In contrast, when the trading ratio is less than one, then an available credit is worth less than a needed credit. For example, if the trading ratio is 0.5, then the buyer would need to purchase 1 seller credit for every 2 needed credits. The WQTS thus provides a way to calculate the equivalency between available credits and needed credits so that potential credit trades can be evaluated.

The WQTS allows a user to evaluate the feasibility of conducting pollutant trades while accounting for the economics of the trade. The WQTS models the pollutants of a watershed taking into account the contributing pollutants and their loads, the contributing sources and their locations, the uncertainty in the pollutant loads, and BMPs for non-point sources and associated uncertainty. The WQTS calculates credits and cost differentials among various sources and estimates trading ratios for buyers and sellers within a watershed.

The WQTS initially calculates the pollutant loading of the subwatersheds of a designated watershed for use when analyzing the effects of various controls. In one embodiment, the WQTS uses a database that contains a description of river basins that specifies each confluence point of a river basin and each watershed and each subwatershed. After a user selects a confluence point at which the trading analysis is to be performed, the WQTS identifies upstream subwatersheds that contribute to that confluence point. The WQTS then calculates the pollutant load of each contributing subwatershed so that the effect of the controls can be analyzed. The database includes for each subwatershed a description of each current and planned land use (including the area and export coefficient of the pollutant) and the load of each current and planned point source. In one embodiment, the WQTS calculates the total current and future pollutant loads for the point and non-point sources of a subwatershed. The current and future pollutant loads for point sources take into consideration the current point sources and the planned point sources (e.g., add a water treatment plant or remove the secondary treatment of an existing water treatment plant) for a subwatershed. The current and future pollutant loads for non-point sources take into consideration the current and planned land uses in the subwatershed. The WQTS also calculates an estimated future load at 50% and 95% confidence levels.

The WQTS allows a user to specify the modifications (e.g., adding, removing, or changing) of the controls such as the BMPs of the land uses and the treatment of the point sources of a subwatershed. The WQTS allows a user to specify the land uses of a subwatershed and the percent of the subwatershed affected and to specify the BMPs that are to be applied to each land use, the year of installation, and whether the BMPs are to be in serial or in parallel. The WQTS also allows a user to specify the types of treatments along with the year of installation that are to be applied to point sources of a subwatershed.

After the BMPs and treatments are defined, the WQTS calculates the local load credit of each subwatershed. The WQTS calculates the load of each land use of a watershed taking into consideration the percent of the subwatershed affected by the land use, the area of the land use, the export coefficient of the land use, and the pollutant removal efficiency of each BMP. The total load for the subwatershed is the sum of the load of its land uses and its point sources. The "local credit" of a subwatershed is the difference between the load prior to and after application of the controls and represents the cumulative effect of the controls of a subwatershed.

When credits are to be traded, the WQTS calculates the "earned credit" of a subwatershed that represents the portion of the local credits that are realized at the confluence point taking into consideration the uncertainty. Various factors influence what percent of a local load contributes to the load at the confluence point. The aggregate of the factors is referred to as the "exchange ratio." The load of a subwatershed that contributes to a confluence point is the exchange ratio times the local load, and the earned credit of a subwatershed at a confluence point is the difference between the load prior to and after application of the controls multiplied by the exchange ratio. The exchange ratio may aggregate the effects of the "uncertainty ratio," "delivery ratio," and so on. The uncertainty ratio represents the uncertainty in the calculated load of a subwatershed resulting from the variation in various parameters including the export coefficient of a land use and the removal efficiency of a BMP. The uncertainty ratio represents the percent of the load that will be generated with a certain confidence level. For example, if the load is calculated to be 100, then the load with a 50% confidence level may be 90 and the load with a 95% confidence level may be 75. The delivery ratio represents the fraction of the load of a subwatershed that is actually delivered to the confluence point. Each downstream subwatershed on the way to the confluence point may only deliver a certain percent of its inflow to its outflow, which is represented by its delivery ratio. Thus, the effective delivery ratio of a subwatershed to a confluence point is calculated based on the delivery ratios of each downstream subwatershed. As discussed above, the WQTS calculates a trading ratio based on the exchange ratio for the available earned credits of a seller and the needed earned credits of a buyer at a certain confidence level. The exchange ratio can be used to determine the relative value of the available and needed credits.

In one embodiment, the WQTS provides the cost of various BMPs for land uses and treatments for point sources. A user can specify various combinations of BMPs and treatments and analyze their cost-effectiveness. The WQTS in one embodiment may automatically identify an optimum combination of BMPs and treatments based on various constraints specified by a user. The optimum combination can be identified using various well-known techniques such as linear programming.

In one embodiment, the WQTS provides a geographic information system ("GIS") that allows a user to identify a river basin and a confluence point of the river basin that is to be analyzed. The GIS database describes the river basins, the confluence points, the subwatersheds, the land uses (current and future), and the point sources. A river basin table provides geographic information of the river basin. The confluence point table provides for each river basin the location of each confluence point along with the "from" subwatersheds whose outflows are to the confluence point and the "to" subwatersheds whose inflows are from the confluence point. The subwatershed table provides geographic information for each subwatershed. The current land use table and the future land use table describe each current and future land use of a subwatershed and include its area and export coefficient. The point source table provides the current and future loads of each point source.

The WQTS includes other database tables that describe the BMPs, the local delivery ratios, the confidence levels, the treatment types, the export coefficient and removal efficiency variations, and the TMDL at each confluence point. The BMP table provides the removal efficiency, the life, the cost, and the coefficient of variation of the removal efficiency for each BMP. The delivery ratio table provides the delivery ratio for each subwatershed. The confidence level table provides the z value of the standard normal distribution at various confidence levels. One skilled in the art will appreciate that different types of distribution can be used. The treatment type table provides the concentration of the pollutant, the life, and the cost of various treatment types. The export coefficient variations table provides the coefficient of variation of the export coefficient of each land use. The TMDL table provides the TMDL of the pollutant at each confluence point.

FIG. 1 illustrates an initial display page of the WQTS in one embodiment. The display page 100 includes a river basin field 101, a confluence point field 102, and a calculation level field 103. The river basin field provides a drop-down list of the river basins defined in the database and allows a user to select the river basin to be analyzed. The confluence point field provides a drop-down list of the confluence points within the selected river basin as defined by the database. The user selects the confluence point at which the pollutant load is to be analyzed. The calculation level field specifies the level (e.g., watershed or subwatershed) at which the analysis is to be performed. (This description assumes that the user has selected the subwatershed calculation level.) The display page also includes a loading button 104, a controls button 105, a trading button 106, and a requirements button 107.

After a user selects the river basin, the confluence point, and the calculation level, the user selects the loading button to direct the WQTS to calculate the current and future pollutant loads for subwatersheds that contribute to the selected confluence point. The WQTS generates a report that lists for each subwatershed the total current load and total future load for the point and non-point sources. FIG. 2 illustrates a sample report listing the current and future pollutant loads for a selected confluence point in one embodiment. The report also lists the total future loads with a 50% and 95% confidence level for non-point sources. The report lists the loads for each subwatershed and then provides the totals at the confluence points.

Figure 3:
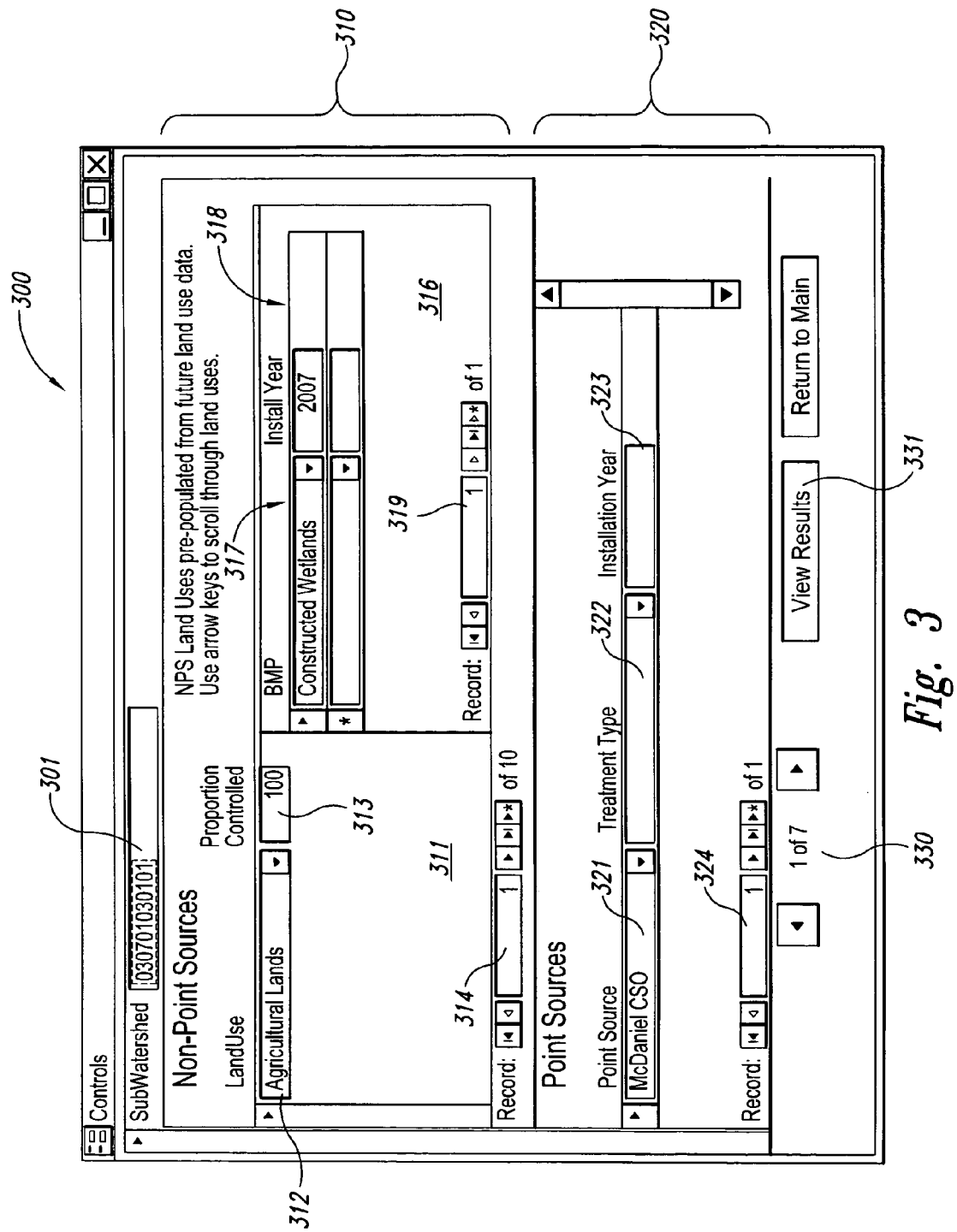
FIG. 3 illustrates a display page for specifying the BMPs and treatments in one embodiment.

After a user selects the river basin, the confluence point, the calculation level, and then the loading button, the user selects the controls button to specify the BMP to be applied to the land uses of a subwatershed and the treatments to be applied to point sources of the subwatershed. FIG. 3 illustrates a display page for specifying the BMPs and treatments in one embodiment. The display page 300 includes a subwatershed field 301, non-point source area 310, and point source area 320. The subwatershed field identifies the subwatershed currently selected. Scroll buttons 330 allow a user to select different subwatersheds that are upstream from the selected confluence point. The non-point source area includes a land use area 311 with a land use field 312, a proportion controlled field 313, and land use scroll buttons 314. The land use scroll buttons allow the user to scroll through and add and delete land uses. The land use field provides a drop-down list through which a user can select a land use of the selected subwatershed. The proportion controlled field 313 specifies the portion of the subwatershed that is controlled by the land use. A BMP field 317 lists the BMPs that have been applied to the selected land use and provides a drop-down list of BMPs that can be applied. An initial year field 318 specifies the starting year of the associated BMP. A BMP area 316 lists the BMPs of the selected land use. The BMPs, shown in the BMP area at the same time, represent BMPs that are applied in series to the land use. BMP scroll buttons 319 allow the user to scroll through sets of serial BMPs that are applied in parallel to the land use. The point source area includes a point source field 321, a treatment type field 322, and an installation year field 323. The point source field provides a drop-down list of the point sources of the selected subwatershed so that the user can select a point source to which a treatment is to be supplied. The treatment type field provides a drop-down list of the possible treatment types of the point source. The installation year field allows the user to specify when the selected treatment is installed. Point source buttons 324 allow a user to select, add, and delete different point sources. A view results button 331 allows a user to direct the WQTS to calculate the local credits of each subwatershed based on the specified controls (e.g., BMP and treatments).

FIG. 4 illustrates a report listing the local credits for a subwatershed in one embodiment. The report is for the currently selected subwatershed. The report lists future load with and without the controls applied, with their difference being the local credit. The report also summarizes the effect of the point source and non-point source controls. The summary of the non-point source controls includes an identification of the BMP, the install year, the life, the efficiency, the load reduction, the cost per pound of reduction, and the total cost of the control. The summary of the point source controls includes an identification of the point source, the treatment type, the effluent concentration, the install year, and the total cost of the control. This report can be generated at the subwatershed, watershed, and river basin levels depending on the selected calculation level.

Figure 5A:
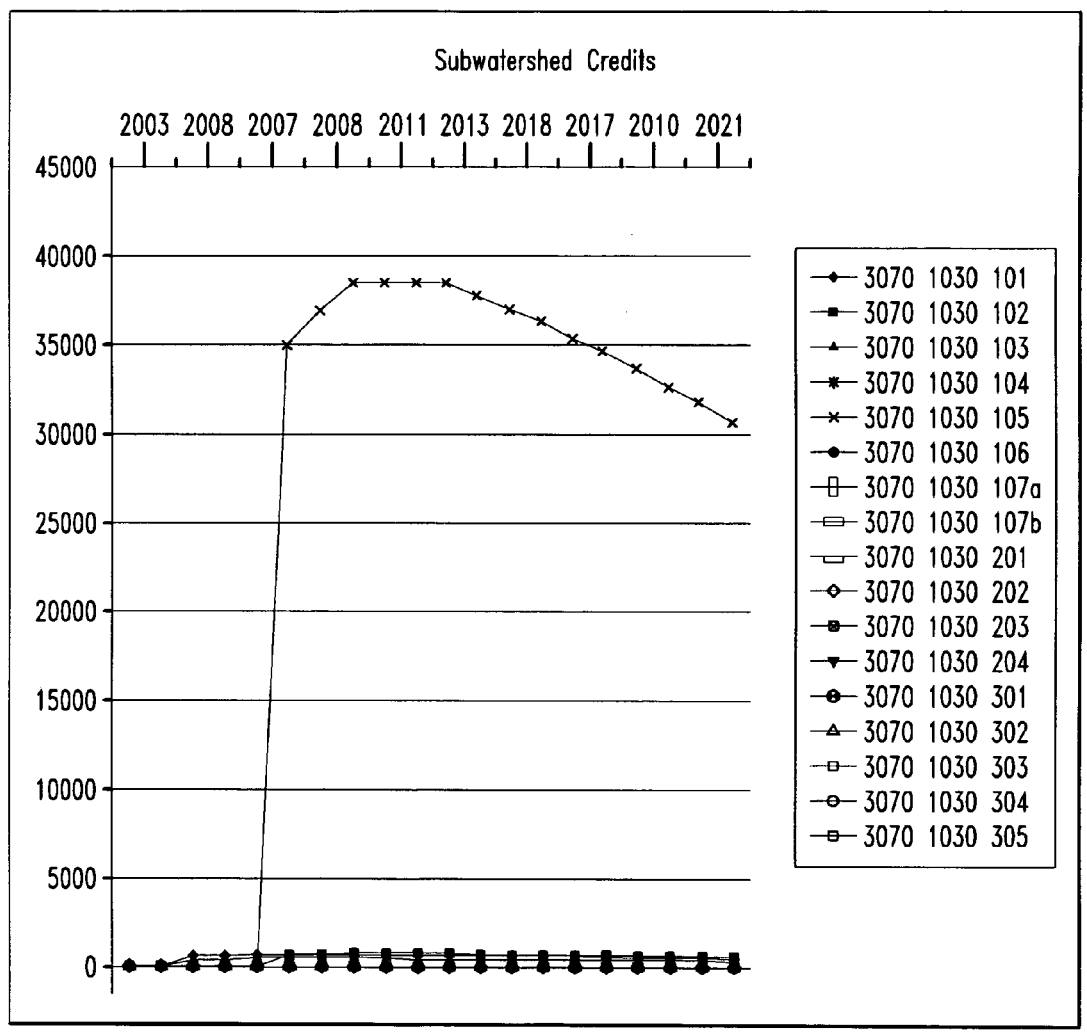
FIG. 5A illustrates a graph of the earned credits for the subwatersheds contributing to a confluence point in one embodiment.

After a user selects the river basin, the confluence point, the calculation level, and then the loading and controls buttons, the user selects the trading button to direct the WQTS to perform the trading calculations. The WQTS requests the user to select a confidence level and then calculates and displays the earned credits (aka the "watershed credits") at the selected confluence point for each subwatershed, factoring in the uncertainties and the selected confidence level. FIG. 5A illustrates a graph of the earned credits for the subwatersheds contributing to a confluence point in one embodiment. The graph provides an indication of the credits versus year for each subwatershed. Although not illustrated in the figures the WQTS also allows a user to select pairs of subwatersheds for which trading ratios are to be calculated. FIG. 5B illustrates a report of the earned credits for a subwatershed contributing to a confluence point in one embodiment. The report includes the local credits, the earned credits, and the uncertainty ratios for each year.

Figure 6:
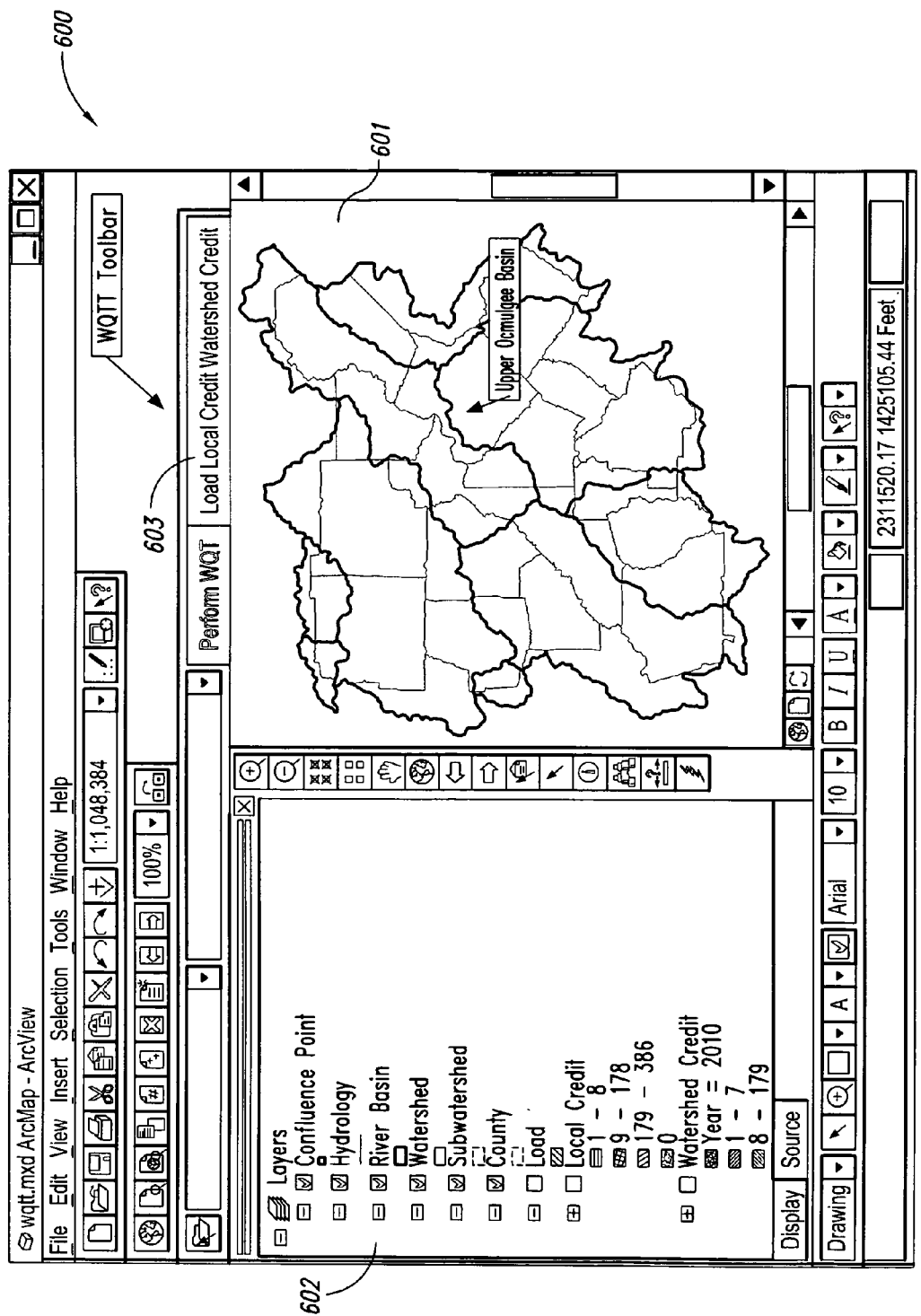
FIG. 6 illustrates a display page of a GIS interface for the WQTS in one embodiment.
Figure 7:
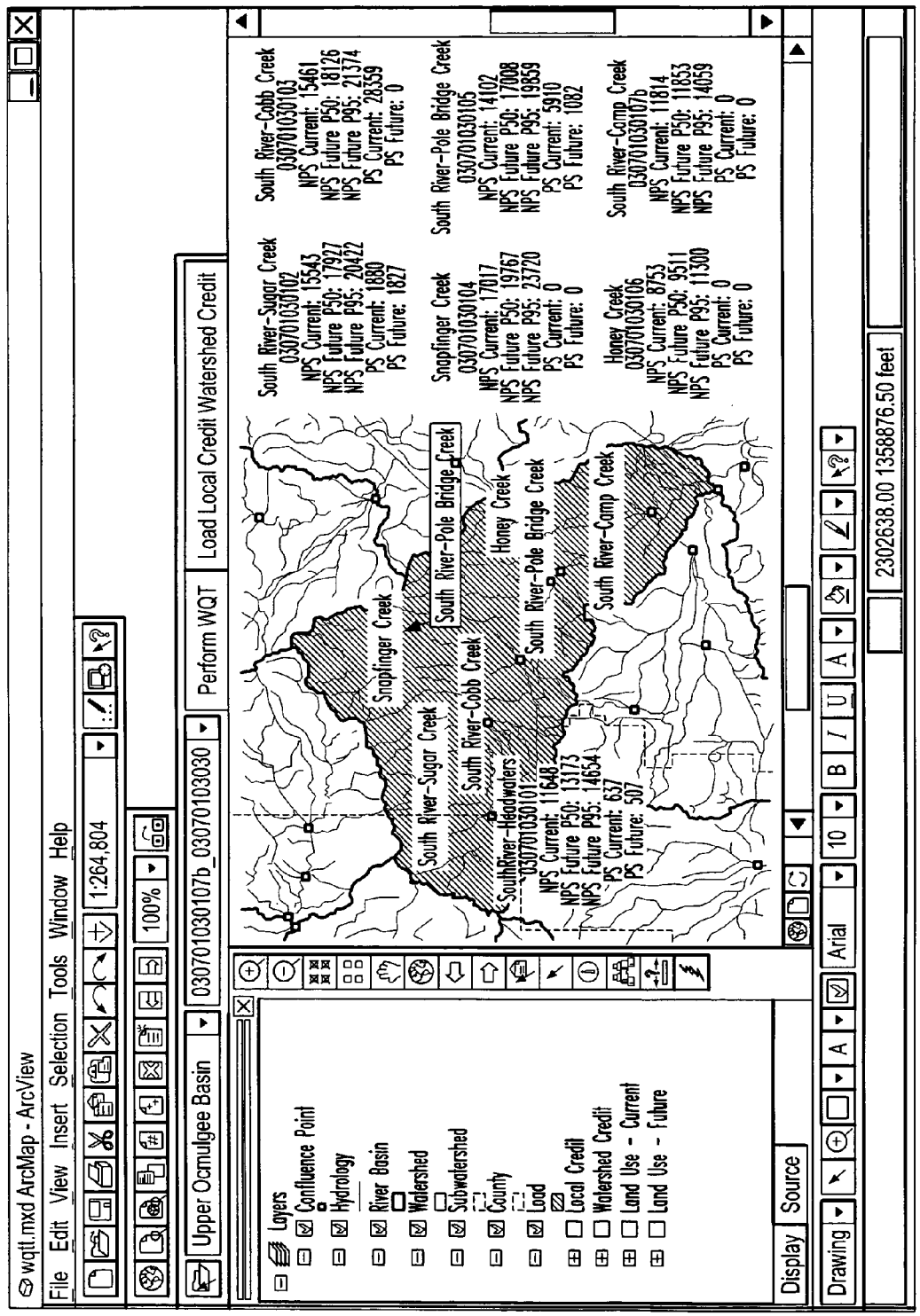
FIG. 7 illustrates a map overlaid with the loading information of the subwatersheds in one embodiment.
Figure 8:
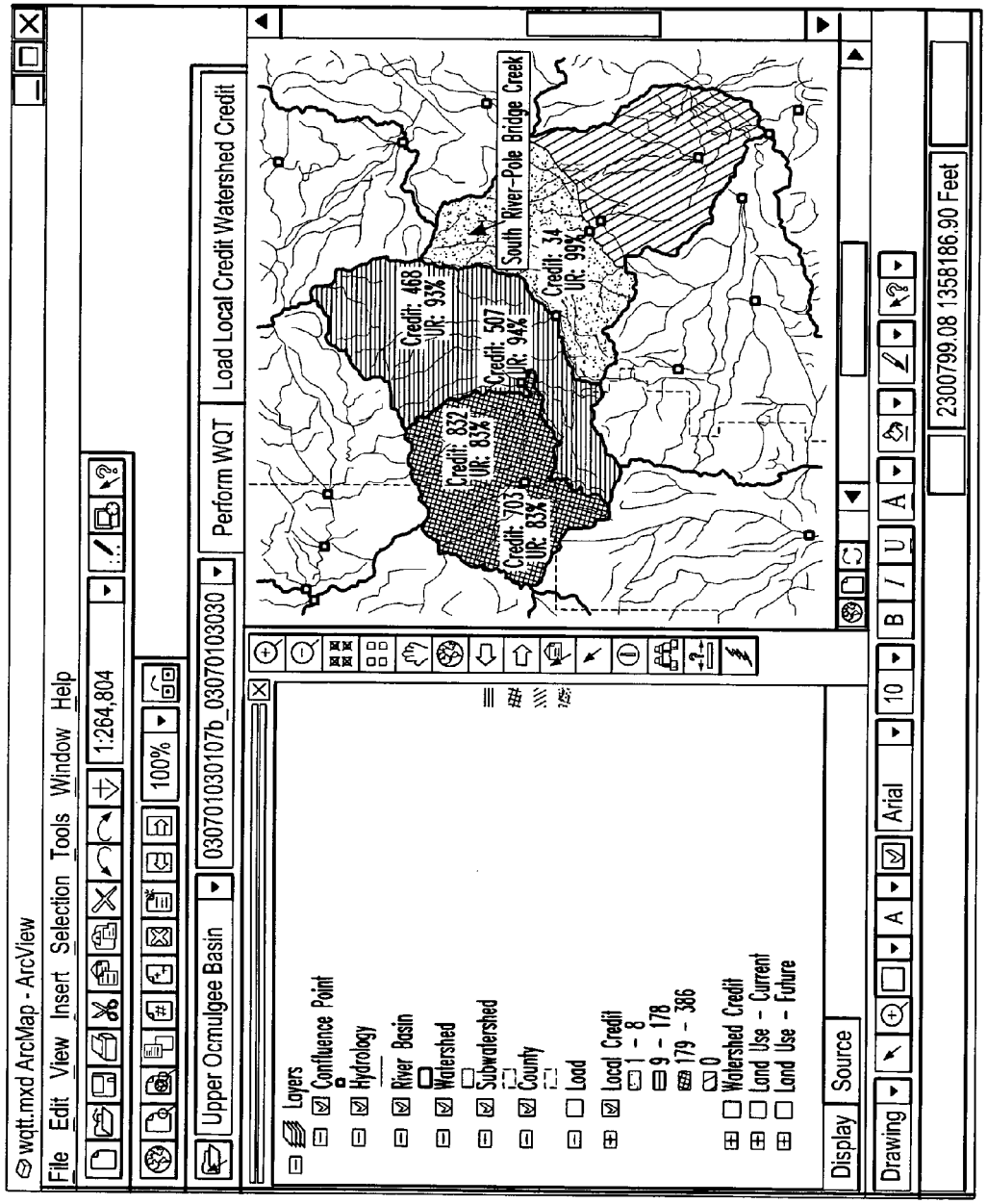
FIG. 8 illustrates a map overlaid with the local credit information of the subwatersheds in one embodiment.
Figure 9:
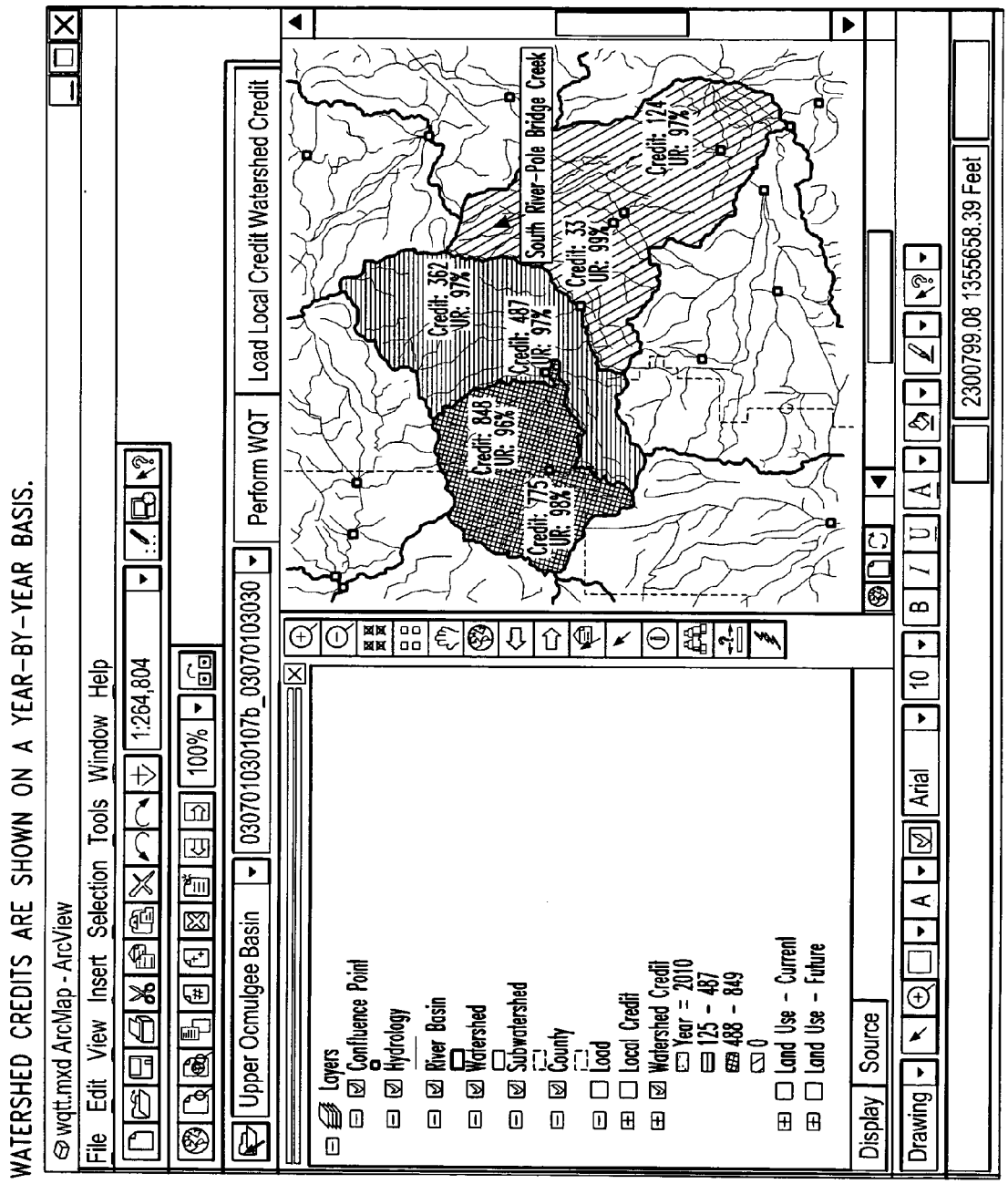
FIG. 9 illustrates a map overlaid with the earned credit information of the subwatersheds in one embodiment.

FIG. 6 illustrates a display page of a GIS interface for the WQTS in one embodiment. The display page 600 displays a map 601 of the subwatersheds contributing to a user-selected confluence point in a user-selected river basin. A layers area 602 allows a user to specify the information that is to be overlaid onto the map by selecting the appropriate boxes. For example, the user may select to overlay onto the map an outline of each subwatershed. After the trading information has been generated using the display page 100 of FIG. 1, the WQTT toolbar 603 allows the user to display the results. FIG. 7 illustrates a map overlaid with the loading information of the subwatersheds in one embodiment. FIG. 8 illustrates a map overlaid with the local credit information of the subwatersheds in one embodiment. FIG. 9 illustrates a map overlaid with the earned credit information of the subwatersheds in one embodiment.

The following scenario provides an overview of a typical use of the WQTS. A person may need to offset an increase in the pollutant load of a point source. That person may have the option of adding certain BMPs to land uses under their control to offset the increase. Alternatively, it may be more cost-effective to apply BMPs to land uses under the control of others. That person would use WQTS to enter the BMP information for their land use to generate the required earned credit to offset the increased load. That person would enter the BMP information and select a confidence level and be presented with cost and the earned credits with an associated uncertainty ratio. That person can then repeat the process for the BMPs that might be applied to others. That person can then use the trading ratios of the BMPs applied to their land uses and those of others to determine the equivalency of the earned credits. Assuming that equivalent credits can be obtained at a lower cost by applying BMPs to the land uses of others, then that person would attempt to trade credits with the other person who controls that land use.

Loading Calculations

The loading calculations performed by the WQTS in one embodiment are described in the following.

The total current load of a pollutant for a subwatershed is calculated by summing the loads generated from each individual land use of the subwatershed. The load of a land use is calculated by multiplying the area of the land use in the subwatershed by the export coefficient of the land use. The export coefficient represents the amount of a pollutant generated by the land use in mass per unit area per time duration (e.g., pounds/acre/year). Thus, the total current load for a subwatershed is represented by the following equation:

$$L_i = \sum_{j=1}^{n_i} (A_{ij} * C_j) \quad (1)$$

where $L_i$ is the total current load of subwatershed i, $A_{ij}$ is the area of land use j in subwatershed i, $C_j$ is the export coefficient of land use j, and $n_i$ is the number of land uses in subwatershed i.

The total future load of a pollutant for a subwatershed is calculated in a similar manner as for the total current load, except using future land uses. The total future load for a subwatershed is represented by the following equation:

$$FL_i = \sum_{j=1}^{n_i} (A_{ij} * C_j) \quad (2)$$

where $FL_i$ is the total future load of subwatershed i, $A_{ij}$ is the area of future land use j in subwatershed i, $C_j$ is the export coefficient of land use j, and $n_i$ is the number of future land uses in subwatershed i.

The standard deviation of the future load of a pollutant of a subwatershed is used to calculate future load at certain confidence levels. The standard deviation is the square root of the variance, which is calculated by summing the square of the product of future average load of each land use with the coefficient of variation for that land use. Thus, the standard deviation of the future load is represented by the following equation:

$$\sigma_i = \left[ \sum_{i=1}^{n_i} (A_{ij} * \overline{C}_j * CVC_j)^2 \right]^{1/2} \quad (3)$$

where $\sigma_i$ is the standard deviation of the future load of subwatershed i, $A_{ij}$ is the area of future land use j within subwatershed i, $\overline{C}_j$ is the mean export coefficient of land use j, $n_i$ is the number of future land uses in subwatershed i, and $CVC_j$ is the coefficient of variability for land use j.

The future load of a subwatershed at a certain confidence level is calculated by multiplying the future load by the standard deviation of the subwatershed by the z value of the confidence level. The future load at a certain confidence level is represented by the following equation:

$$FL_i(x) = FL_i[1 + z(x)\sigma_i] \quad (4)$$

where $FL_i(x)$ is the future load of subwatershed i at confidence level x, $FL_i$ is the future load of subwatershed i, $\sigma_i$ is the standard deviation of the future load of subwatershed i, and $z(x)$ is the z value for confidence level x.

The current point source load of a subwatershed is calculated by summing the loads of each point source in the subwatershed. The point source load is represented by the following equation:

$$PSL_i = \sum_{j=1}^{m_i} L_{ij} \quad (5)$$

where $PSL_i$ is the current point source load of subwatershed i, $L_{ij}$ is the current load of current point source j in subwatershed i, and $m_i$ is the number of current point sources in subwatershed i.

The future point source load of a subwatershed is calculated in a similar manner to the current point source load and is represented by the following equation:

$$FPSL_i = \sum_{j=1}^{m_i} L_{ij} \quad (6)$$

where $FPSL_i$ is the future point source load of subwatershed i, $L_{ij}$ is the future load of future point source j in subwatershed i, and $m_i$ is the number of future point sources in subwatershed i.

The delivery ratio represents the ratio of the load of a subwatershed that makes it downstream to a confluence point. Each subwatershed has a local delivery ratio that represents the portion of the inflow load that makes it to the outlets of the individual watersheds. The delivery ratio is calculated by multiplying the local delivery ratio of each downstream subwatershed together and is represented by the following equation:

$$DR_i = \prod_{j=1}^{n_i} LDR_j \quad (7)$$

where $DR_i$ is the delivery ratio of subwatershed i, $LDR_j$ is the local delivery ratio of downstream subwatershed j, and $n_i$ is the number of downstream subwatersheds of subwatershed j, including subwatershed i itself.

The point source load of a subwatershed that makes it to the confluence point is the point source load of the subwatershed multiplied by the delivery ratio. The point source load of a subwatershed contributing to a confluence point is represented by the following equation:

$$PS_i = PSL_i * DR_i \quad (8)$$

where $PS_i$ is the point source load contribution of subwatershed i at the confluence point, where $PSL_i$ is the current point source load of subwatershed i, and $DR_i$ is the delivery ratio of subwatershed i.

The future point source load of a subwatershed that makes it to the confluence point is calculated in a manner similar to the way the current point source load is calculated and is represented by the following equation:

$$FPS_i = FPSL_i * DR_i \quad (9)$$

where $FPS_i$ is the future point source load contribution of subwatershed i at the confluence point, $FPSL_i$ is the future point source load of subwatershed i, and $DR_i$ is the delivery ratio of subwatershed i to the confluence point.

Local and Earned Credit Calculations

The local and earned credit calculations performed by the WQTS in one embodiment are described in the following. The non-point source load from a subwatershed having at most one BMP per land use is calculated based on the removal efficiency of the BMP and the portion of the land use affected by the BMP and is represented by the following equation:

$$L_{ij} = C_j * A_{ij} * (1-\eta_j) * f_{ij} + C_j * A_{ij} * (1-f_{ij}) \quad (10)$$

where $L_{ij}$ is the load of subwatershed i from land use j, $C_j$ is the export coefficient of land use j, $A_{ij}$ is the area of land use j in subwatershed i, and $f_{ij}$ is the fraction of land use j in subwatershed i treated with a BMP having a pollutant removal efficiency of $\eta_j$.

The mean (or average) load per interval (e.g., season) of a subwatershed over a period (e.g., one year) is calculated based on the mean of the export coefficient and the removal efficiency. The mean load of a subwatershed is represented by the following equation:

$$\bar{L}_{ij} = \bar{C}_j * A_{ij} * (1-\bar{\eta}_j) * f_{ij} + \bar{C}_j * A_{ij} * (1-f_{ij}) \quad (11)$$

where $\bar{L}_{ij}$ is the mean load of subwatershed i from land use j, $\bar{C}_j$ is the mean export coefficient of land use j, $A_{ij}$ is the area of land use j in subwatershed i, and $f_{ij}$ is the fraction of land use j in subwatershed i treated with a BMP having a mean pollutant removal efficiency of $\bar{\eta}_j$.

The coefficient of variation of the load of a subwatershed is derived based on the coefficients of variation of the export efficiency and the removal efficiency and is represented by the following equation:

$$CVL_{ij} = \left( (1 + CVC_j^2) \left( 1 + \frac{f_{ij}^2 * (1-\bar{\eta}_j)^2 * CV\eta_j^2}{(1 - f_{ij} + (1-\bar{\eta}_j) * f_{ij})^2} \right) - 1 \right)^{1/2} \quad (12)$$

where $CVL_{ij}$ is the coefficient of variation of the load generated from land use j within subwatershed i, $CVC_j$ is the coefficient of variation of the export coefficient of land use j, $CV\eta_j$ is the coefficient of variation of the removal efficiency of the BMP, and $f_{ij}$ is the fraction of land use j within subwatershed i treated with the BMP having a mean pollutant removal efficiency of $\bar{\eta}_j$.

Equations (11) and (12) for the mean and coefficient of variation of the land use assume implementation of only one BMP per land use as a pollution controlling unit. When multiple BMPs are used in series on a land use, then the removal efficiency is calculated as one minus each of the inefficiencies (i.e., $1-\eta_j$) multiplied together. The mean removal efficiency of the group of multiple BMPs in series combination is represented by the following equation:

$$\bar{\eta}_{ij} = 1 - \prod_{k=1}^{n_{ij}} (1-\bar{\eta}_{jk}) \quad (13A)$$

where $\bar{\eta}_{ij}$ is the mean removal efficiency of the serial BMPs of land use j in subwatershed i, $\bar{\eta}_{jk}$ is the mean removal efficiency of BMP k in land use j, and $n_{ij}$ is the number of BMPs of land use j in subwatershed i. Using equations (13A) and (11), the mean pollutant loading from a land use having a group of multiple BMPs in series is represented by the following equation:

$$\bar{L}_{ij} = \bar{C}_j * A_{ij} * f_{ij} \prod_{k=1}^{n_{ij}} (1-\bar{\eta}_{jk}) + \bar{C}_j * A_{ij} * (1 - f_{ij}) \quad (13B)$$

where $\bar{L}_{ij}$ is the mean load of subwatershed i from land use j, $C_j$ is the export coefficient of land use j, $A_{ij}$ is the area of land use j in subwatershed i, $f_{ij}$ is the fraction of land use j in subwatershed i treated with a BMP having a mean pollutant removal efficiency of $\bar{\eta}_j$, and $n_{ij}$ is the number of BMPs of land use j in subwatershed i.

The coefficient of variation of the removal efficiency for serial BMPs is the product of one plus the variance of the removal efficiency divided by the inefficiency for each BMP. That coefficient of variation is represented by the following equation:

$$CV\eta_{ij} = \prod_{k=1}^{n_{ij}} \left( 1 + \frac{\text{Var}(\eta_{jk})}{(1-\bar{\eta}_{jk})^2} \right)^{1/2} \quad (14A)$$

where $CV\eta_{ij}$ is the coefficient of variation of the removal efficiency of land use j in subwatershed i, $\text{Var}(\eta_{jk})$ is the variance of the removal efficiency for BMP k in land use j, $\bar{\eta}_{jk}$ is the mean removal efficiency for BMP k in land use j, and $n_{ij}$ is the number of BMPs of land use j in subwatershed i. Using equations (14A) and (12), the coefficients of variation of pollutant loading from land use j having a group of multiple BMPs in series are represented by the following equation:

$$CVL_{ij} = \quad (14B)$$

$$\left\{ (1 + CVC_j^2) \left[ 1 + \frac{f_{ij}^2 \prod_{k=1}^{n_{ij}} (1-\bar{\eta}_{jk})^2 \prod_{k=1}^{n_{ij}} \left(1 + \frac{\text{Var}(\eta_{jk})}{(1-\bar{\eta}_{jk})^2}\right)}{\left(1 - f_{ij} + f_{ij}\prod_{k=1}^{n_{ij}}(1-\bar{\eta}_{jk})\right)^2} \right] - 1 \right\}^{1/2}$$

where $CVL_{ij}$ is the coefficient of variation of the load of subwatershed i, $CVC_j$ is the coefficient of variation of the export coefficient of land use j, $A_{ij}$ is the area of land use j in subwatershed i, $\bar{\eta}_{jk}$ is the mean removal efficiency of BMP k in land use j, and $n_{ij}$ is the number of BMPs of land use j in subwatershed i.

When multiple BMPs are in parallel on a land use, then the mean load for a land use in the subwatershed is the product of the mean export coefficient of that land use for the subwatershed times the sum of the areas of the land use adjusted by the mean removal inefficiency. The load with multiple BMPs in parallel is represented by the following equation:

$$\overline{L}_{ij} = \overline{C}_j * \sum_{k=1}^{n_{ij}} A_{ij} * (1 - \overline{\eta}_{jk}) \qquad (15)$$

where $\overline{L}_{ij}$ is the mean load of subwatershed i from land use j, $\overline{C}_j$ is the mean export coefficient of land use j, $A_{ij}$ is the area of land use j in subwatershed i, $\overline{\eta}_{jk}$ is the mean removal efficiency for BMP k in land use j, and $n_{ij}$ is the number of BMPs in parallel of land use j in subwatershed i.

The coefficient of variation of pollutant loading for BMPs in parallel is represented by the following equation:

$$CVL_{ij} = \left( (1 + CVC_j^2) \left( 1 + \frac{\sum_{k=1}^{n_{ij}} A_{ij}^2 * (1 - \overline{\eta}_{jk})^2 * CV\eta_{jk}^2}{\left( \sum_{k=1}^{n_{ij}} A_{ij} * (1 - \overline{\eta}_{jk}) \right)^2} \right) - 1 \right)^{1/2} \qquad (16)$$

where $CVL_{ij}$ is the coefficient of variation of the load of subwatershed i from land use j, $CVC_j$ is the coefficient of variation of the export coefficient of land use j, $A_{ij}$ is the area of land use j in subwatershed i, $\overline{\eta}_{jk}$ is the mean removal efficiency of BMP k in land use j, $CV\eta_{jk}$ is the coefficient of variation of BMP k in land use j, and $n_{ij}$ is the number of BMPs of land use j in subwatershed i.

The mean pollutant load of a subwatershed is the sum of the mean pollutant loads from each land use within the subwatershed and is represented by the following equation:

$$\overline{L}_i = \sum_{j=1}^{m_i} \overline{L}_{ij} \qquad (17)$$

where $\overline{L}_i$ is the mean pollutant load of subwatershed i, $\overline{L}_{ij}$ is the mean pollutant load of land use j in subwatershed i, and $m_i$ is the number of land uses in subwatershed i.

The variance of the total load from a subwatershed is represented by the following equation:

$$\text{Var}(L_i) = \sum_{j=1}^{m_i} (\overline{L}_i * CVL_{ij})^2 \qquad (18)$$

where $\text{Var}(L_i)$ is the variance of the pollutant load of subwatershed i, $\overline{L}_i$ is the mean pollutant load of subwatershed i, $CVL_{ij}$ is the coefficient of variation of the load of land use j in subwatershed i, and $m_i$ is the number of land uses in subwatershed i.

The coefficient of variation of the total load from a subwatershed is represented by the following equation:

$$CVL_i = \frac{(\text{Var}(L_i))^{1/2}}{\overline{L}_i} \qquad (19)$$

where $CVL_i$ is the coefficient of variation of the load of subwatershed i, $\text{Var}(L_i)$ is the variance of the pollutant load of subwatershed i, and $\overline{L}_i$ is the mean load of subwatershed i.

The one-sided lower and upper confidence intervals for an assumed distribution of the load delivered from a subwatershed at its outlet is represented by the following equation:

$$CI_i = \overline{L}_i \pm z_\alpha * \overline{L}_i * [Var(L_i)]^{1/2} = \overline{L}_i [1 \pm z_\alpha * [Var(L_i)]^{1/2}] \qquad (20)$$

where $CI_i$ is the confidence interval for the load delivered from the outlet of subwatershed i, $\overline{L}_i$ is the mean load of subwatershed i, $\text{Var}(L_i)$ is the variance of the pollutant load of subwatershed i, and $z_\alpha$ is the z value at significance level $\alpha$.

The two-sided lower and upper confidence interval for an assumed distribution of the load delivered from a subwatershed at its outlet is represented by the following equation:

$$CI_i = \overline{L}_i \pm z_{\alpha/2} * \overline{L}_i * [Var(L_i)]^{1/2} = \overline{L}_i [1 \pm z_{\alpha/2} * [Var(L_i)]^{1/2}] \qquad (21)$$

where $CI_i$ is the confidence interval for the load delivered from the outlet of subwatershed i, $\overline{L}_i$ is the mean load of subwatershed i, $\text{Var}(L_i)$ is the variance of the pollutant load of subwatershed i, and $z_{\alpha/2}$ is the z value at significance level $\alpha/2$.

The uncertainty ratio for a non-point source accounts for the variability in load delivered from a subwatershed due to variation in the export coefficient of a land use and the removal efficiency of a BMP. The uncertainty ratio is calculated by dividing the mean load by the mean load times one plus the z value at a certain confidence level (e.g., 95%) times the coefficient of variation of the load. When the value of $z_\alpha$ corresponding to the 95$^{th}$ percentile of the total load distribution is approximately 2, the uncertainty ratio for the non-point source load delivered from a subwatershed is represented by the following equation:

$$UR_i = \frac{\overline{L}_i}{\overline{L}_i[1 + z_\alpha * CVL_i]} = \frac{1}{1 + 2 * CVL_i} \qquad (22)$$

where $UR_i$ is the uncertainty ratio for subwatershed i, $\overline{L}_i$ is the mean load of subwatershed i, $CVL_i$ is the coefficient of variation of the load of subwatershed i, and $z_\alpha$ is the z value at a certain confidence level.

The uncertainty ratio for a point source, such as a wastewater treatment plant, is assumed to have negligible variability in the load delivered to the outlet of a subwatershed (i.e., CV is equal to 0). Therefore, the uncertainty ratio due to the point sources of a subwatershed is represented by the following equation:

$$UR_i = 1 \qquad (23)$$

where $UR_i$ is the uncertainty ratio of a point source in subwatershed i.

The exchange ratio for a given point or non-point source in a watershed i is represented by the following equation:

$$ER_i = DR_i * UR_i * WR_i * RR_i \qquad (24)$$

where $ER_i$ is the exchange ratio for subwatershed i, $DR_i$ is the delivery ratio for subwatershed i, $UR_i$ is the uncertainty ratio for subwatershed i, $WR_i$ is the water quality ratio for subwatershed i, and $RR_i$ is the retirement ratio for subwatershed i. The water quality ratio is included to protect local water quality from adverse impacts of pollutant loading contributed by the subwatershed as it travels to the confluence point. The retirement ratio allows a certain percentage of the available credits to be retired or excluded from trading to increase the potential for water quality benefit or to provide a margin of environmental safety for the overall trading program.

Since the delivery ratio as calculated above does not take into consideration any variability, a delivery ratio correction factor may be used to adjust the delivery ratio. The correction factor is assumed to have a normal distribution with a unity mean and a certain coefficient of variation based on uncertainty in the delivery ratio. The adjusted exchange ratio is represented by the following equation:

$$\hat{ER}_i = \lambda * ER_i \tag{25}$$

where $\hat{ER}_i$ is the corrected exchange ratio for subwatershed i and $\lambda$ is the correction factor.

The trading ratios are represented by the following equation:

$$TR_s = \frac{ER_s}{ER_b} \tag{26}$$

where $TR_s$ is the trading ratio for seller s, $ER_s$ is the exchange ratio for seller s, and $ER_b$ is the exchange ratio for buyer b.

The amount of credits earned by a subwatershed by applying a BMP is represented by the following equation:

$$\overline{EC}_i = (\overline{L}_i^{pre} - \overline{L}_i^{post}) * \hat{ER}_i \tag{27}$$

where $\overline{EC}_i$ is the mean earned credit for subwatershed i, $\overline{L}_i^{pre}$ is the mean load of subwatershed i prior to applying the BMP, $\overline{L}_i^{post}$ is the mean load of subwatershed i after applying the BMP, and $\hat{ER}_i$ is the corrected exchange ratio for subwatershed i.

The variance of the earned credit is represented by the following equation:

$$Var(\overline{EC}_i) = ((\overline{L}_i^{pre} * CVL_i^{pre})^2 + (\overline{L}_i^{post} * CVL_i^{post})^2) * \hat{ER}_i^2 \tag{28}$$

where $Var(\overline{EC}_i)$ is the variance of mean earned credit for subwatershed i, $\overline{L}_i^{pre}$ is the mean load of subwatershed i prior to applying the BMP, $CVL_i^{pre}$ is the coefficient of variation of subwatershed i prior to applying the BMP, $\overline{L}_i^{post}$ is the mean load of subwatershed i after applying the BMP, $CVL_i^{post}$ is the coefficient of variation of subwatershed i after applying the BMP, and $\hat{ER}_i$ is the corrected exchange ratio for subwatershed i.

The lower and upper confidence intervals of the earned credit corresponding to a certain significance level are represented by the following equation:

$$CI_i = \overline{EC}_i [1 \pm z_{\alpha/2} [Var(EC_i)]^{1/2}] \tag{29}$$

where $CI_i$ is the confidence interval of subwatershed i, $\overline{EC}_i$ is the mean earned credit for subwatershed i, $z_{\alpha/2}$ is the z value at significance level $\alpha/2$, and $Var(EC_i)$ is the earned credit for subwatershed i.

FIGS. 10–14 illustrate the processing of the WQTS in one embodiment.

Figure 10:
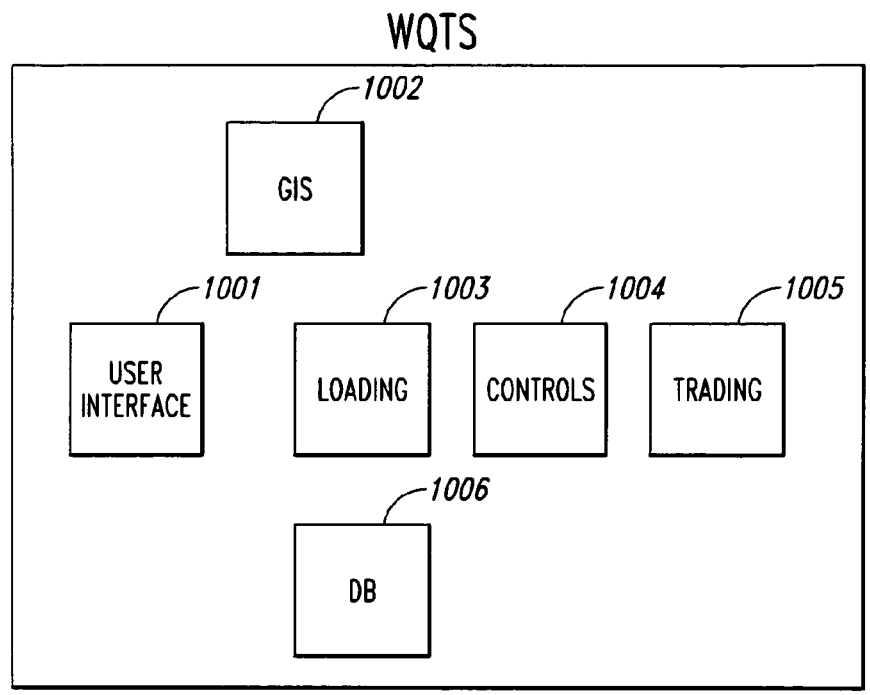
FIG. 10 is a block diagram illustrating the components of the WQTS in one embodiment.

FIG. 10 is a block diagram illustrating the components of the WQTS in one embodiment. The WQTS includes a user interface component 1001, a GIS component 1002, a loading component 1003, a controls component 1004, a trading component 1005, and a database 1006. The user interface component controls the user interface of the WQTS. The GIS component provides a geographic information system interface of the WQTS. The loading component performs the loading calculations of the WQTS including the current loads and future loads. The controls component controls the input of the control information and performs the controls calculations of the WQTS including the local credits. The trading component performs the trading calculations of the WQTS including the earned credits. The database contains the GIS information and the other information describing BMPs, coefficients of variation, and so on.

Figure 11:
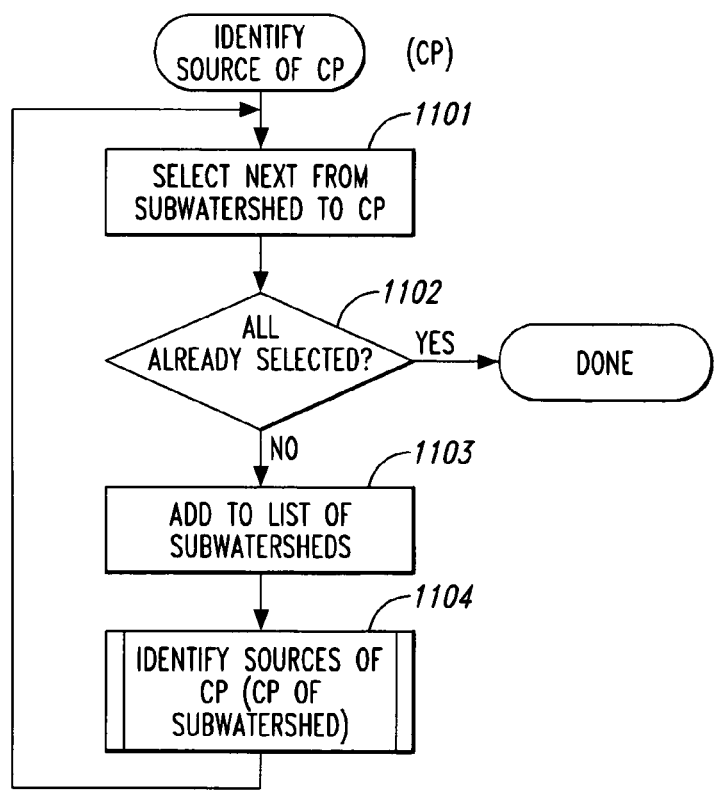
FIG. 11 is a flow diagram illustrating the processing of a component that identifies subwatersheds in one embodiment.

FIG. 11 is a flow diagram illustrating the processing of a component that identifies subwatersheds in one embodiment. After a river basin and a confluence point are selected, the component identifies the subwatersheds that are upstream from the confluence point. The illustrated processing is recursive. One skilled in the art will appreciate that non-recursive processing may alternatively be performed. The component is passed an identification of the confluence point. In blocks 1101–1104, the component loops selecting each subwatershed that directly contributes to the confluence point and recursively identifies each subwatershed that indirectly contributes to the confluence point. In block 1101, the component selects the next subwatershed that directly contributes to the passed confluence point. In decision block 1102, if all the subwatersheds have already been selected, then the component returns, else the component continues at block 1103. In block 1103, the component adds the selected subwatershed to a list of subwatersheds that are upstream from the original confluence point. In block 1104, the component recursively invokes the component passing the inflow of the selected subwatershed as a confluence point to identify the subwatersheds that contribute to the selected subwatershed. The component then loops to block 1101 to select the next subwatershed that directly contributes to the passed confluence point.

Figure 12:
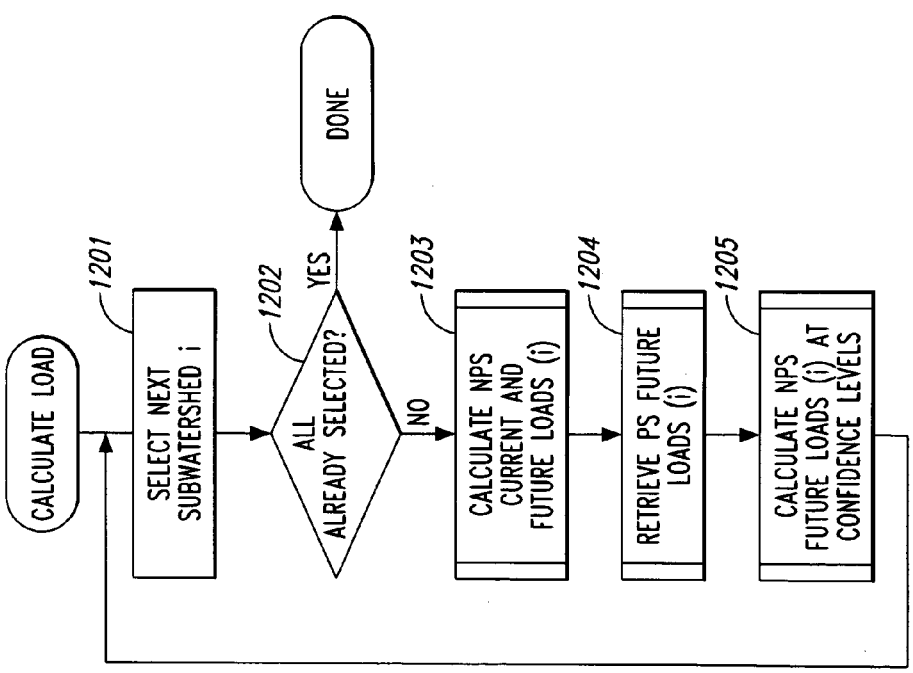
FIG. 12 is a flow diagram illustrating the processing of a component that calculates the loading for the subwatersheds that are upstream from a confluence point in one embodiment.

FIG. 12 is a flow diagram illustrating the processing of a component that calculates the loading for the subwatersheds that are upstream from a confluence point in one embodiment. The component calculates the current and future loads for the point and non-point sources and calculates the future loads of the non-point sources at various confidence levels. In block 1201, the component selects the next subwatershed. In decision block 1202, if all the subwatersheds have already been selected, then the component completes, else the component continues at block 1203. In block 1203, the component calculates the current and future loads for the non-point sources of the selected subwatershed as illustrated by equations (1) and (2). In block 1204, the component retrieves the future load of the selected subwatershed from the database. In block 1205, the component calculates the future load of the non-point sources of the selected subwatershed at various confidence levels as illustrated by equations (3) and (4). The component then loops to block 1201 to select the next subwatershed.

Figure 13:
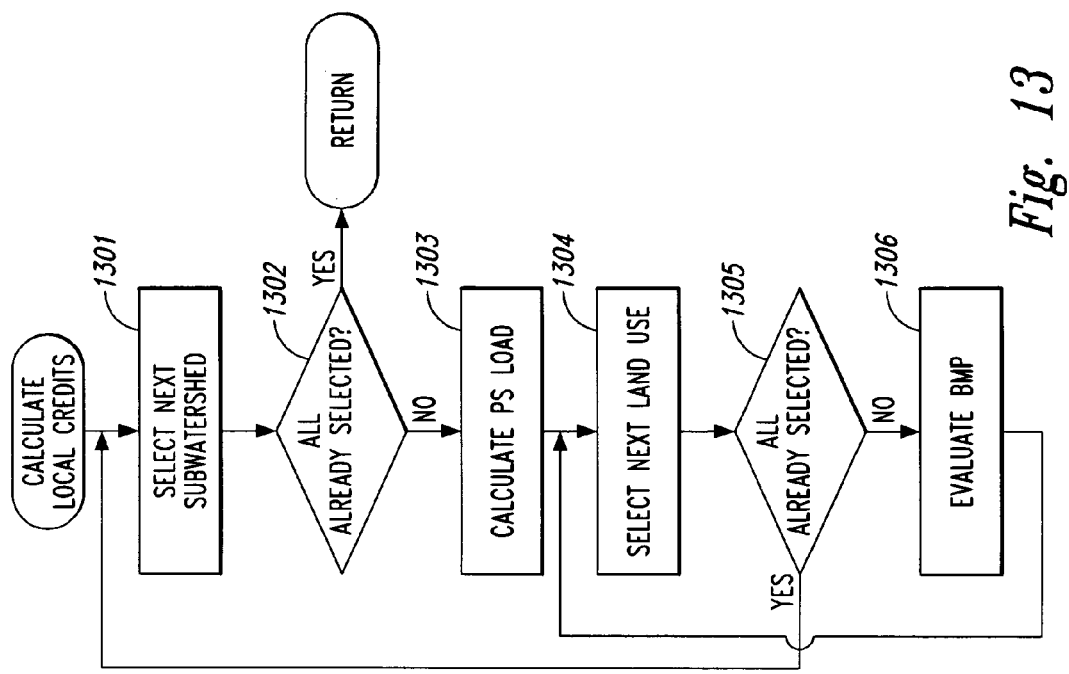
FIG. 13 is a flow diagram posted in the processing of a component that calculates the local credits for the subwatersheds that are upstream from a confluence point in one embodiment.

FIG. 13 is a flow diagram posted in the processing of a component that calculates the local credits for the subwatersheds that are upstream from a confluence point in one embodiment. The component loops selecting each subwatershed and calculating the local credits for point sources and non-point sources of that subwatershed. In block 1301, the component selects the next subwatershed. In decision block 1302, if all the subwatersheds have already been selected, then the component returns, else the component continues at block 1303. In block 1303, the component calculates the load of the point sources contributing to the local credits of the selected subwatershed. In decision blocks 1304–1306, the component loops calculating the load of each land use contributing to the local credits of the selected subwatershed. In block 1304, the component selects the next land use of the selected subwatershed. In decision block 1305, if all the land uses of the selected subwatershed have already been selected, then the component continues at block 1301 to select the next subwatershed, else the component continues at block 1306. In block 1306, the component evaluates the BMPs of the selected land use. The component calculates the reduction in load attributable to the serial BMPs according to equations (10) and (12) and the parallel BMPs according to equations (10), (14A), and (14B) to identify the portion of the load contributed by that land use. The component then loops to block 1304 to select the next land use. The component adds the load for each land use to determine a total non-point source load. The component then adds the load for the point sources and the non-point sources and subtracts the sum from the future load calculated without the controls to determine the local credits for the selected subwatershed.

Figure 14:
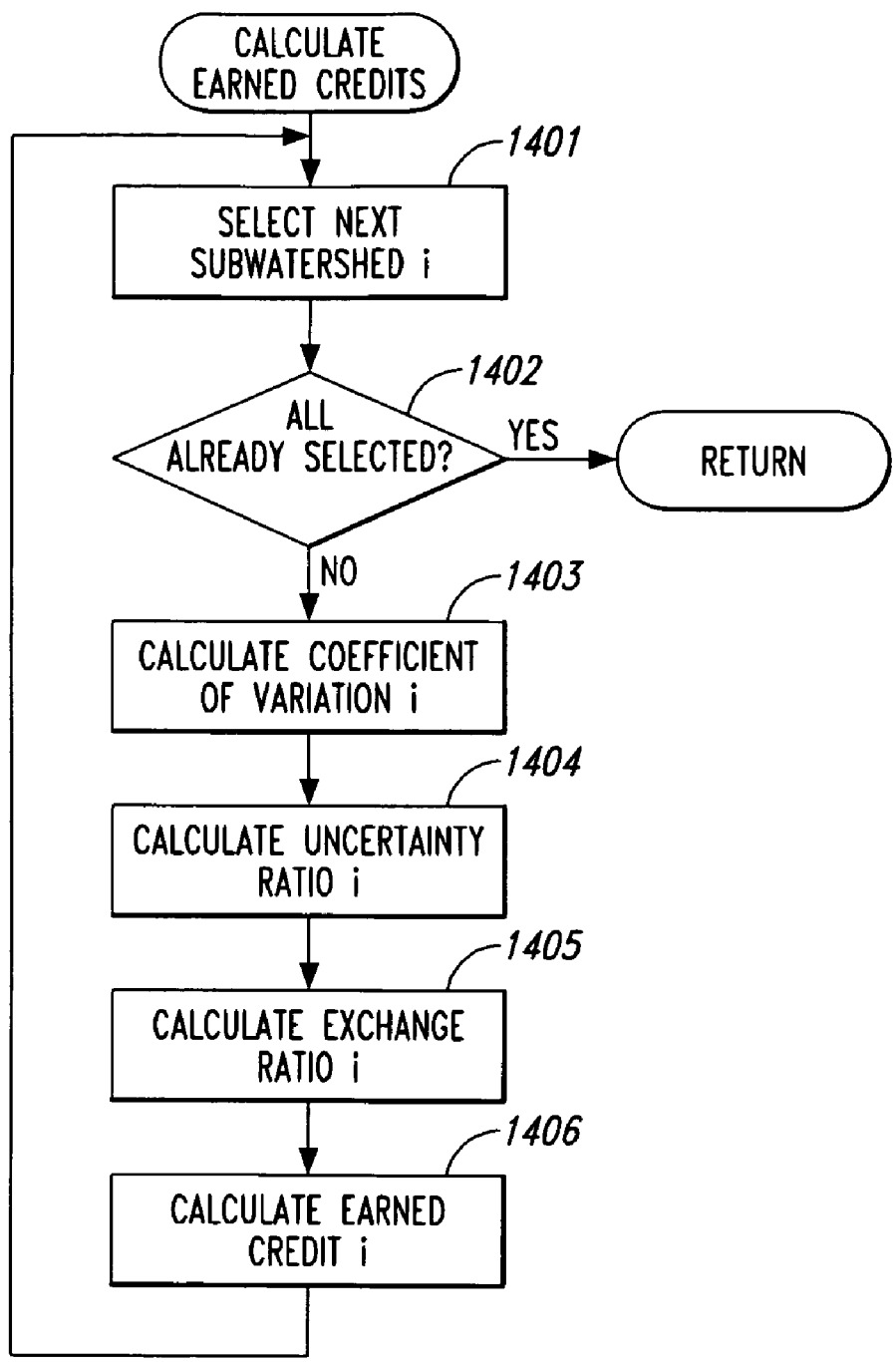
FIG. 14 is a flow diagram illustrating the processing of a component that calculates the earned credits for subwatersheds that are upstream from a confluence point in one embodiment.

FIG. 14 is a flow diagram illustrating the processing of a component that calculates the earned credits for subwatersheds that are upstream from a confluence point in one embodiment. In block 1401, the component selects the next subwatershed. In decision block 1402, if all the subwatersheds have already been selected, then the component returns, else the component continues at block 1403. In block 1403, the component calculates the coefficient of variation of the load for the selected subwatershed according to equation (18). In block 1404, the component calculates the uncertainty ratio for the selected subwatershed according to equation (22). In block 1405, the component calculates the exchange ratio for the selected subwatershed according to equations (24) and (25). In block 1406, the component calculates the earned credits for the selected subwatershed according to equation (27). The component then loops to block 1401 to select the next subwatershed.

From the foregoing, it will be appreciated that specific embodiments of the invention have been described herein for purposes of illustration, but that various modifications may be made without deviating from the spirit and scope of the invention. One skilled in the art will appreciate that the WQTS can be used to evaluate for various types of pollutants (e.g., phosphorus and sediment) and can be used at various levels of granularity (e.g., subwatersheds, watersheds, and point and non-point sources). Accordingly, the invention is not limited except as by the appended claims.

We claim:

1. A method in a computer system for determining a pollutant load of a source at a selected confidence level, the method comprising:
   receiving an indication of a control to be applied to the source, the control having a removal efficiency;
   calculating an uncertainty ratio for the source at the confidence level based on coefficients of variation of an export coefficient and the removal efficiency, the uncertainty ratio indicating the portion of the load that will be generated by the source with the confidence level; and
   calculating a determined load for the source based on the load and the calculated uncertainty ratio.

2. The method of claim 1 wherein the source is a subwatershed that has multiple non-point sources of the pollutant and the control is applied to a specific non-point source.

3. The method of claim 2 wherein the controlled non-point source is a land use and the control is a best management practice.

4. The method of claim 1 wherein the calculating of the determined load is further based on a delivery ratio to a confluence point.

5. The method of claim 4 wherein the delivery ratio factors in local delivery ratios of sources downstream from the source.

6. The method of claim 4 wherein the calculating of the determined load is based on a water quality ratio and a retirement ratio.

7. The method of claim 1 including calculating a trading ratio based on uncertainty ratios of two sources.

8. The method of claim 1 wherein the uncertainty ratio is calculated by the following equation:

$$UR_i = \frac{\overline{L}_i}{\overline{L}_i[1 + z_\alpha * CVL_i]} = \frac{1}{1 + 2 * CVL_i}$$

where $UR_i$ is the uncertainty ratio for subwatershed i, $\overline{L}_i$ is the mean load of subwatershed i, $CVL_i$ is the coefficient of variation of the load of subwatershed i, and $z_\alpha$ is the z value at a certain confidence level.

9. The method of claim 8 wherein the coefficient of variation of the load is calculated by the following equation:

$$CVL_i = \frac{(\text{Var}(L_i))^{1/2}}{\overline{L}_i}$$

where $CVL_i$ is the coefficient of variation of the load of subwatershed i, $\text{Var}(L_i)$ is the variance of the pollutant load of subwatershed i, and $\overline{L}_i$ is the mean load of subwatershed i.

10. The method of claim 8 wherein the coefficient of variation of the removal efficiency for controls in series is represented by the following equation:

$$CV\eta_{ij} = \prod_{k=1}^{n_{ij}} \left(1 + \frac{\text{Var}(\eta_{jk})}{(1 - \overline{\eta}_{jk})^2}\right)^{\frac{1}{2}}$$

where $CV\eta_{ij}$ is the coefficient of variation of the removal efficiency of land use j in subwatershed i, $\text{Var}(\eta_{jk})$ is the variance of the removal efficiency for BMP k in land use j, $\overline{\eta}_{jk}$ is the mean removal efficiency for BMP k in land use j, and $n_{ij}$ is the number of BMPs of land use j in subwatershed i.

11. A method in a computer system for determining a load of a pollutant of a source within a confidence level, the source having a load, the method comprising:
   calculating an uncertainty ratio for the source at the confidence level based on a coefficient of variation representing an uncertainty in the load of the source, the uncertainty ratio indicating a portion of the load that will be generated by the source with the confidence level; and calculating a determined load for the source based on the load and the calculated uncertainty ratio.

12. The method of claim 11 wherein the coefficient of variation is based on an export coefficient.

13. The method of claim 12 wherein the export coefficient is based on a land use of the source.

14. The method of claim 12 wherein the calculating of the determined load is further based on a delivery ratio to a confluence point.

15. The method of claim 14 wherein the delivery ratio factors in local delivery ratios of sources downstream from the source.

16. The method of claim 14 wherein the calculating of the determined load is based on a water quality ratio and a retirement ratio.

17. The method of claim 12 including calculating a trading ratio based on uncertainty ratios of two sources.

18. The method of claim 12 wherein the uncertainty ratio is calculated by the following equation:

$$UR_i = \frac{\overline{L}_i}{\overline{L}_i[1 + z_\alpha * CVL_i]} = \frac{1}{1 + 2 * CVL_i}$$

where $UR_i$ is the uncertainty ratio for subwatershed i, $\overline{L}_i$ is the mean load of subwatershed i, $CVL_i$ is the coefficient of variation of the load of subwatershed i, and $z_\alpha$ is the z value at a certain confidence level.

19. The method of claim 18 wherein the coefficient of variation of the load is calculated by the following equation:

$$CVL_i = \frac{(\mathrm{Var}(L_i))^{1/2}}{\overline{L}_i}$$

where $CVL_i$ is the coefficient of variation of the load of subwatershed i, $\mathrm{Var}(L_i)$ is the variance of the pollutant load of subwatershed i, and $\overline{L}_i$ is the mean load of subwatershed i.

20. The method of claim 11 including receiving an indication of a control to be applied to the source, the control having a removal efficiency, wherein the coefficient of variation is based on the removal efficiency of the control.

21. The method of claim 20 wherein the source is a subwatershed that has multiple non-point sources of the pollutant and the control is applied to a non-point source.

22. The method of claim 21 wherein the controlled non-point source is a land use and the control is a best management practice.

23. The method of claim 20 wherein the calculating of the determined load is further based on a delivery ratio to a confluence point.

24. The method of claim 23 wherein the delivery ratio factors in local delivery ratios of sources downstream from the source.

25. The method of claim 23 wherein the calculating of the determined load is based on a water quality ratio and a retirement ratio.

26. The method of claim 20 including calculating a trading ratio based on uncertainty ratios of two sources.

27. The method of claim 20 wherein the uncertainty ratio is calculated by the following equation:

$$UR_i = \frac{\overline{L}_i}{\overline{L}_i[1 + z_\alpha * CVL_i]} = \frac{1}{1 + 2 * CVL_i}$$

where $UR_i$ is the uncertainty ratio for subwatershed i, $\overline{L}_i$ is the mean load of subwatershed i, $CVL_i$ is the coefficient of variation of the load of subwatershed i, and $z_\alpha$ is the z value at a certain confidence level.

28. The method of claim 20 wherein the coefficient of variation of the load is calculated by the following equation:

$$CVL_i = \frac{(\mathrm{Var}(L_i))^{1/2}}{\overline{L}_i}$$

where $CVL_i$ is the coefficient of variation of the load of subwatershed i, $\mathrm{Var}(L_i)$ is the variance of the pollutant load of subwatershed i, and $\overline{L}_i$ is the mean load of subwatershed i.

29. The method of claim 20 wherein the coefficient of variation of the removal efficiency for controls in series is represented by the following equation:

$$CV\eta_{ij} = \prod_{k=1}^{n_{ij}} \left(1 + \frac{\mathrm{Var}(\eta_{jk})}{(1 - \overline{\eta}_{jk})^2}\right)^{\frac{1}{2}}$$

where $CV\eta_{ij}$ is the coefficient of variation of the removal efficiency of land use j in subwatershed i, $\mathrm{Var}(\eta_{jk})$ is the variance of the removal efficiency for BMP k in land use j, $\eta_{jk}$ is the mean removal efficiency for BMP k in land use j, and $n_{ij}$ is the number of BMPs of land use j in subwatershed i.

* * * * *